United States Patent
Sanghera et al.

(10) Patent No.: US 8,105,509 B2
(45) Date of Patent: Jan. 31, 2012

(54) HOT-PRESSED TRANSPARENT CERAMICS AND CERAMIC LASERS

(75) Inventors: Jasbinder S. Sanghera, Ashburn, VA (US); Guillermo R Villalobos, Springfield, VA (US); Woohong Kim, Lorton, VA (US); Shyam S Bayya, Ashburn, VA (US); Ishwar D. Aggarwal, Charlotte, NC (US); Bryan Sadowski, Falls Church, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 86 days.

(21) Appl. No.: 12/620,613

(22) Filed: Nov. 18, 2009

(65) Prior Publication Data

US 2010/0155678 A1 Jun. 24, 2010

Related U.S. Application Data

(60) Provisional application No. 61/138,730, filed on Dec. 18, 2008.

(51) Int. Cl.
*F21V 9/00* (2006.01)
*G02B 5/02* (2006.01)
*G02C 7/10* (2006.01)
*G02F 1/361* (2006.01)
*G03B 11/00* (2006.01)

(52) U.S. Cl. ........ 252/582; 428/403; 428/404; 428/405; 428/406; 428/407; 501/94; 501/151; 501/152; 977/773; 977/776

(58) Field of Classification Search .................. 252/582; 264/681; 372/40; 428/403, 404, 405, 406, 428/407; 501/94, 152, 151; 977/773, 776
See application file for complete search history.

(56) References Cited

U.S. PATENT DOCUMENTS 7,449,238 B1 * 11/2008 Villalobos et al. ............ 428/403
2007/0242714 A1 * 10/2007 Sumida et al. .................. 372/40

OTHER PUBLICATIONS

R. Gaume, B. Viana, J. Derouet, D. Vivien, Spectroscopic properties of Yb-doped scandium based compounds Yb: CaSc2O4, Yb:SrSc2O4 and Yb:Sc2SiO5, Optical Materials 22, 107-115, 2003, Elsevier Science B.V. All rights reserved.*

* cited by examiner

*Primary Examiner* — Harold Pyon
*Assistant Examiner* — Bijan Ahvazi
(74) *Attorney, Agent, or Firm* — Amy Ressing; Joslyn Barritt (57) ABSTRACT

A transparent polycrystalline ceramic having scattering and absorption loss less than 0.2/cm over a region comprising more than 95% of the originally densified shape and further provides a process for fabricating the same by hot pressing. The ceramic can be any suitable ceramic such as yttria ($Y_2O_3$) or scandia ($Sc_2O_3$) and can have a doping level of from 0 to 20% and a grain size of greater than 30 μm, although the grains can also be smaller than 30 μm. In a process for making a transparent polycrystalline ceramic in accordance with the present invention, ceramic nanoparticles can be coated with a sintering aid to minimize direct contact of adjacent ceramic powder particles and then baked at high temperatures to remove impurities from the coated particles. The thus-coated particles can then be densified by hot pressing into the final ceramic product. The invention further provides a transparent polycrystalline ceramic solid-state laser material and a laser using the hot pressed polycrystalline ceramic.

6 Claims, 8 Drawing Sheets

HOT-PRESSED TRANSPARENT CERAMICS AND CERAMIC LASERS

CROSS-REFERENCE

This application claims the benefit of priority based on U.S. Provisional Patent Application No. 61/138,730 filed on Dec. 18, 2008, the entirety of which is hereby incorporated by reference into the present application.

TECHNICAL FIELD

The present invention relates to hot-pressed transparent $Yb:Y_2O_3$ and other advanced ceramics and processes of making the same. The present invention also relates to a ceramic laser in which the gain medium is a hot pressed ceramic rod, disc or slab.

BACKGROUND

Advanced ceramics such as ytterbium-doped yttria ($Yb:Y_2O_3$) are excellent laser media due to their hardness, strength, and transparency in the range of 0.4 to 10 μm. Their thermal properties enable the laser to operate at higher temperatures and dissipate heat generated during laser operation better than other laser materials, such as yttrium aluminum garnet (YAG).

However, single crystal $Yb:Y_2O_3$ is difficult to produce in the large sizes and necessary configurations for high-power lasers. Polycrystalline $Yb:Y_2O_3$ can be used in such high-performance applications if it is produced in a manner as to produce a fine grained transparent material with clean grain boundaries, very low porosity, and less than 10 ppm levels of impurities.

Transparent polycrystalline $Yb:Y_2O_3$ laser material conventionally has been produced by sintering ceramic powders in a process whereby a nanosized ceramic powder is cold-pressed into a green body having the desired shape which is then heated without pressure to form the final product. This process is different from sintering by hot-pressing, in which the ceramic powder is heated under pressure to form the final product. Although the powder being hot-pressed must not melt to a great extent, some melting of secondary phases in the powder or surface melting can be allowed, and in the case of porcelains and clay products, the melting of these secondary phases can act as an intrinsic sintering aid to "glue" the primary solid particles together with a glassy phase to form the solid ceramic material.

However, advanced ceramics do not have these intrinsic sintering aids and therefore some extrinsic sintering aid must be added. For example, materials such as $Yb:Y_2O_3$ often are mixed with a secondary material such as lithium fluoride (LiF) as a sintering aid. Some sintering aids may liquefy at or somewhat below the primary material's densification temperature thereby promoting liquid phase sintering. Other sintering aid materials exhibit higher solid-state diffusion coefficients than the primary material's self-diffusion coefficient. The secondary material may conversely have a lower solid-state diffusion coefficient that prevents exaggerated grain growth and promotes grain boundary refinement and pinning. The sintering aid may also simply clean or etch the primary material's surfaces thereby enhancing solid-state diffusion.

For small batches, the powdered sintering aids can be mixed with the powder to be sintered with a mortar and pestle. In larger batches, mixing can be accomplished by ball milling, attritor milling, high shear wet milling, and variations or combinations of these methods. However, in the case of optical or laser quality polycrystalline materials, homogeneity must be measured on the nanometer scale, and mechanical mixing results in homogeneity of the sintering aid that is only in the hundreds of microns range, a level of homogeneity that is several orders of magnitude too high to produce optical or laser quality polycrystalline material. Inhomogeneity of the sintering aid within the ceramic powder results in areas that have too much sintering aid and other areas that have little or no sintering aid. While this is generally not too important in fabrication of materials that are relatively easy to sinter or in opaque materials, it is a major problem in the fabrication of transparent ceramics.

The sintering aid must also be removed from the densified material to prevent it from being trapped and forming pores in the material. In the case of optical ceramics, if the sintering aid is not effectively removed, the pores formed by the trapped material can cause high scattering and absorption losses in the final article. The scattering sites in such ceramic materials are typified by inclusions and voids that appear white when viewed in reflected light. The absorbing regions are dark when viewed in both transmitted and reflected light. In such a case, the article does not possess uniform optical losses, and consequently the yield is poor, costs are high and large size and different shapes are not possible to manufacture.

In the case of $Y_2O_3$ ceramics using LiF as a sintering aid, the inclusions contributing to optical scattering are due to trapped LiF that was not removed during sintering and by compounds that resulted from impurities in the starting ceramic powder and sintering aid. Additional scattering is caused by the presence of voids, i.e., pores, that possess very high scattering efficiencies. The absorption losses are caused by oxygen vacancies which arise from the presence of carbon related impurities. The carbon-related impurities react with oxygen in the $Y_2O_3$ to produce $CO/CO_2$ volatile gases and leave behind vacancies in the molecular structure, causing the material to turn black. The extent of the absorbing regions is influenced by the LiF sintering aid, which reacts with the carbon to form volatile carbon-fluorine species that can be easily removed. Not enough LiF leads to oxygen vacancies, whereas excess LiF gets trapped and leads to optical scattering.

Transmission losses in such transparent ceramics are also due to absorption caused by impurities including transition metals and other ionic species present in the ceramic. Scattering in transparent ceramics can be minimized by optimizing the processing conditions such as powder size distribution control, sintering pressure, and sintering temperature. However, absorption loss caused by the presence of various transition metals and other ionic impurities in the ceramic is critical since such defects lower the transmittance and have a detrimental effect on lasing.

Sintered Yb doped $Y_2O_3$ ceramic materials have had a demonstrated use as laser materials. See A. A. Kaminskii et al. "Lasing and Refractive Indices of Cubic Yttrium Oxide $Y_2O_3$ Doped with $Nd^{3+}$ and $Yb^{3+}$ Ions." Crystallography Reports, Vol. 48, No. 6 (2003) pp 1041-1043; and J. Kong et al. "9.2 W diode-end-pumped $Yb:Y_2O_3$ ceramic laser." Applied Physics Letters, Vol. 86 (2005) pp. 161116-1-161116-3. Sintering is achieved using nano-sized starting powder that is uniaxially cold pressed and then cold isostatically pressed into a green body, which is then heated in vacuum without external pressure or load. The nanopowder is a strict requirement and highlighted by previous authors in their patents. See U.S. Pat. No. 6,825,144 to Hideki (polycrystalline laser gain media are limited to crystals having a mean grain size of less than 20 μm, and laser quality ceramic cannot be made if the grains are larger).

Nano-sized powder has a huge driving force to lower the surface energy and so heating at elevated temperatures allows densification (sintering) to take place whereby the grains grow slightly and the surface energy is lowered. Typically, the grains are a few microns in size. However, the grain size must remain small so that pores can be removed to enable production of laser quality ceramics. If prolonged times or higher temperatures are used in an attempt to eliminate porosity, the grains grow larger than about 25 μm, and it becomes difficult to remove the pores. In addition, in such cases, significant grain growth will occur, which makes it even more difficult to remove the pores.

It has been assumed that it is not possible to make a laser quality ceramic from Yb doped $Y_2O_3$ using hot pressing. In hot pressing, a sintering aid is mixed with the powder. The mixed powder is placed in a hot press, evacuated, and then heated up to the densification temperature, at which time a load of several thousand psi is applied. The problem has been that the sintering aid, which prevents carbon contamination from the hot press die, typically leads to grain growth. In fact grains are typically larger than 30 μm and more typically larger than 100 μm. Therefore it was widely believed that hot pressed Yb doped $Y_2O_3$ will not produce laser quality ceramic since the porosity cannot be reduced. In fact this rationale has led the other research groups away from using hot pressing.

If one could solve the problem of scattering using hot pressing, then not only could laser quality ceramics be attainable, but other advantages of hot pressing could be exploited. These include scalability to large sizes and complex shapes, relatively short processing times, and mass production. Manufacturing costs are lowered and the potential of making high power lasers, including >>KW class lasers, becomes more viable.

SUMMARY

This summary is intended to introduce, in simplified form, a selection of concepts that are further described in the Detailed Description. This summary is not intended to identify key or essential features of the claimed subject matter, nor is it intended to be used as an aid in determining the scope of the claimed subject matter. Instead, it is merely presented as a brief overview of the subject matter described and claimed herein.

The present invention provides a transparent polycrystalline ceramic having combined scattering and absorption losses of less than 0.2/cm over a region comprising more than 95% of the originally densified shape and further provides a process for fabricating the same by hot pressing. The ceramic can be any suitable ceramic such as yttria ($Y_2O_3$) or scandia ($Sc_2O_3$) and can have a doping level of from 0 to 20% and a grain size of greater than 30 μm, although smaller grains are also possible. In a process for making a transparent polycrystalline ceramic in accordance with the present invention, ceramic nanoparticles can be coated with a sintering aid so that adjacent $Y_2O_3$ (or $Sc_2O_3$) powder particles are not in direct contact with each other and then baked at high temperatures to remove impurities from the coated particles. The thus-coated particles can then be densified by hot pressing into the final ceramic product. The present invention further provides a laser based upon ceramic Yb:$Y_2O_3$ (or $Sc_2O_3$) fabricated by hot pressing which has grains larger than 30 μm and has high optical quality suitable for laser emission.

BRIEF DESCRIPTION OF THE DRAWINGS

FIGS. 2A and 2B are SEM photographs of mixed $Y_2O_3$ and LiF powders. FIG. 2B depicts a sample wherein LiF has been dissolved and precipitated on $Y_2O_3$ in accordance with the present invention.

DETAILED DESCRIPTION

The aspects and features of the present invention summarized above can be embodied in various forms. The following description shows, by way of illustration, combinations and configurations in which the aspects and features can be put into practice. It is understood that the described aspects, features, and/or embodiments are merely examples, and that one skilled in the art may utilize other aspects, features, and/or embodiments or make structural and functional modifications without departing from the scope of the present disclosure.

For example, although the product and process in accordance with the present invention may be described in terms of an exemplary embodiment in which a doped yttria ceramic is made from $Yb^{3+}$ doped $Y_2O_3$ (Yb:$Y_2O_3$) ceramic nanopowders using LiF as a sintering aid, one skilled in the art would understand that in other embodiments, any suitable ceramic powders, including undoped $Y_2O_3$ ceramic powders and doped or undoped scandia ($Sc_2O_3$) powders, and any suitable sintering aid can be used as appropriate to make a transparent ceramic having desired optical or other properties. For example, undoped transparent ceramics can be used in applications such as windows or as lens covers. On the other hand, due to the absorption characteristics of certain elements, the dopant and doping level in a doped transparent ceramic can be chosen so that the final material exhibits the desired transmission and/or absorption characteristics for the application in which it is to be used.

In an exemplary embodiment in accordance with the present invention, a high-quality transparent ytterbium-doped yttrium oxide (Yb:$Y_2O_3$) ceramic material can be made by coating a high-uniformity loose Yb:$Y_2O_3$ ceramic nanopowder with a dissolved solution of a sintering aid such as LiF, drying the coated powder by baking at high temperatures in air, and then densifying the dried powder by hot-pressing to form the final ceramic material. A transparent Yb:Y$_2$O$_3$ ceramic material produced in accordance with this process exhibits scattering and absorption losses of less than 0.2/cm over a region comprising more than 95% of the original densified shape. The ceramic can have a doping concentration of from 0 to 20%, and can have both smaller (<30 μm) and larger (>30 μm) grains with a mono-, biomodal, and/or multimodal dispersion of the grains throughout the material, while still exhibiting low attenuation, low scattering, and good suitability for lasing.

A transparent polycrystalline Yb:Y$_2$O$_3$ ceramic in accordance with the present invention can be made using a high-purity uniformly nano-sized Yb:Y$_2$O$_3$ powder having no hard agglomerates such as that described in the concurrently-filed patent application entitled "Yb:Y$_2$O$_3$ Ceramic Powders," (Navy Case No. 98,968), which shares inventors in common with the present invention and is hereby incorporated by reference into the present application.

As noted above, transparent Yb:Y$_2$O$_3$ ceramics can be made by densifying the yttria ceramic powder. Traditional processes used for densifying yttria attempted to either not use any sintering aid and to rely on the sintering of nanoparticles with very fine particle size distribution, or to use relatively large amounts (>1% by weight) of sintering aid to overcome the possibility of having regions with no sintering aid. However, the traditional process for achieving a fine nanoparticle size distribution results in the use of only ~20% of the prepared powder. The other 80% of the powder is too large or otherwise unsuitable for sintering without use of a sintering aid. Densification with a sintering aid allows the use of greater than 90% of the powder produced, but it comes at the cost of more involved heating/pressure schedules, higher temperatures resulting in larger grain growth, and a final product yield of ~50% because, as described below, the final product has too much absorption and scattering to be useful.

Figure 1A:
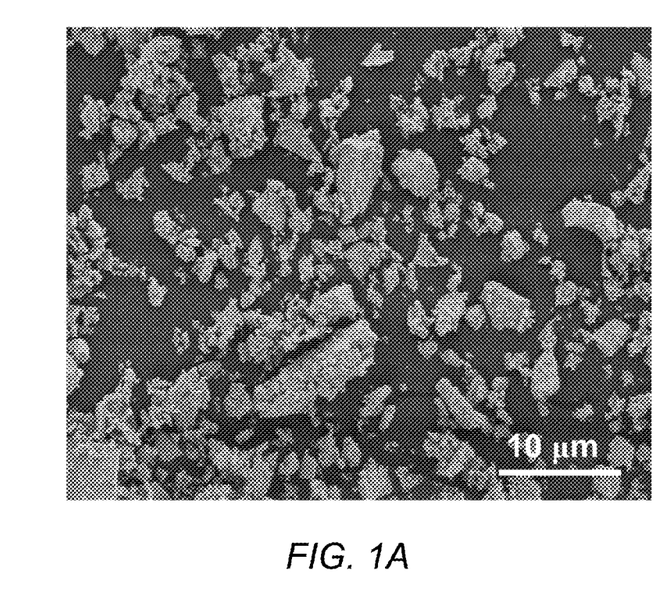
FIGS. 1A and 1B are SEM photographs of $Y_2O_3$ ceramic powder (FIG. 1A) and LiF powder (FIG. 1B).
Figure 1B:
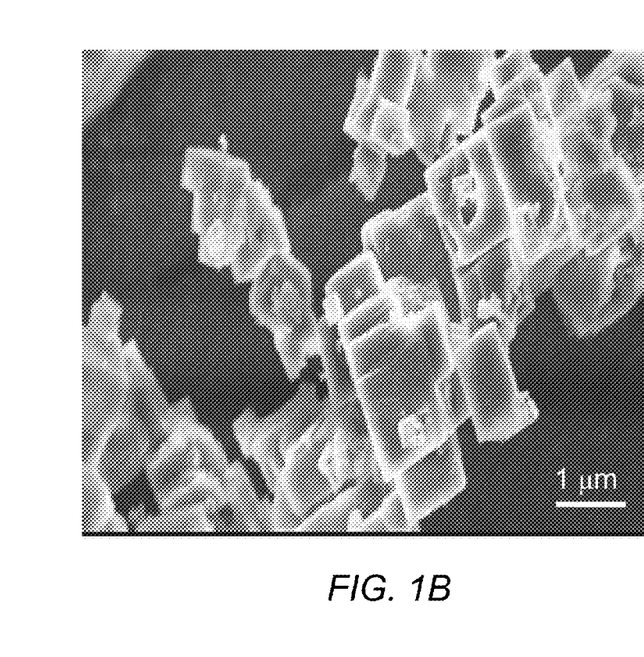
Figure 2A:
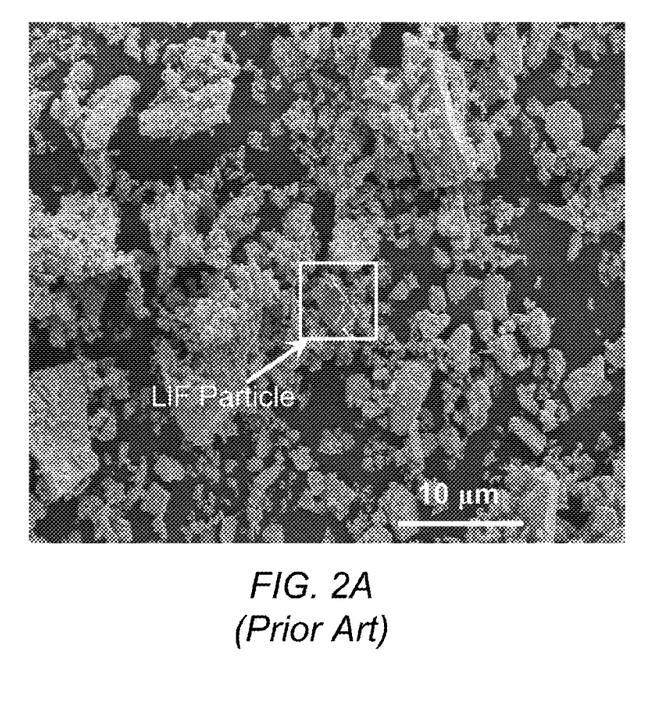
FIG. 2A depicts a sample of $Y_2O_3$ and LiF powders that have been mechanically mixed as in the prior art.

In conventional processes using a sintering aid, the sintering aid, for example, LiF powder, is mixed into the ceramic powder using a mortar and pestle, or by ball milling, attritor milling, high shear wet milling, and various combinations of these processes. However, as can be seen in FIGS. 1A and 1B, the LiF powder shown in FIG. 1B is of a much larger scale than the yttria powder shown in FIG. 1A, and this difference in particle size makes the mixture of yttria and LiF far from homogeneous. This inhomogeneity is seen in the mechanically mixed yttria/LiF powder shown in FIG. 2A, which clearly illustrates the presence of discrete LiF particles within the yttria powder.

As discussed above, the presence of these discrete particles within the final ceramic product can create scattering and attenuation losses, making the final product unsuitable as a high-quality solid state laser material.

The scattering sites are best reduced or eliminated by homogeneously distributing the sintering aid as a coating on the starting ceramic powder particles so as to minimize direct contact of adjacent Y$_2$O$_3$ particles (or Sc$_2$O$_3$ particles, or their doped particles). This allows a reduction in the total amount of sintering aid used and consequently reduces the amount of unwanted reaction byproducts that are left in the material as scattering sites.

Thus, in accordance with the present invention, a high-quality transparent Yb:Y$_2$O$_3$ ceramic material can be made by coating the loose ceramic powder with a dissolved solution of a sintering aid such as LiF, drying the coated powder by baking at high temperatures in air, and then densifying the dried powder by hot-pressing to form the final ceramic material. By preparing the ceramic powder in accordance with this method, more than 90% of the powder can be used. A ceramic material prepared in accordance with this process can exhibit scattering and absorption losses of less than 0.2/cm over a region comprising more than 95% of the originally densified shape. In order to minimize the scattering and absorption losses and improve performance of the final product, the powders can preferably be a uniform nano-scale ceramic powder having no hard agglomerates such as the powder described in the concurrently-filed patent application entitled "Yb:Y$_2$O$_3$ Ceramic Powders" described above.

In one exemplary embodiment of the process according to the present invention, nano-scale homogeneity of the sintering aid on such nanopowders can be achieved by dissolving the LiF sintering aid in a suitable solvent, such as water and suspending the Yb:Y$_2$O$_3$ powder in the solution. In such a case, the LiF sintering aid is not actually in contact with the particles since it is dissolved into Li$^+$ and F$^-$ ions. The ions are brought out of solution and into intimate contact with the Yb:Y$_2$O$_3$ particles by drying or inducing precipitation. Care must be taken during this step to ensure that the LiF precipitates on the particle surface and not as separate particles in the liquid. This can be done by slowly creating a supersaturated solution of Li$^+$ and F$^-$ ions that heterogeneously nucleate on a surface (in this case the Yb:Y$_2$O$_3$ powder) instead of nucleating in the liquid.

In another embodiment of the process according to the present invention, the LiF coating can be applied to the loose powders by spray coating.

Irrespective of the method of application, in accordance with the present invention, the LiF-coated loose powder can then be baked at high temperatures for several hours (e.g., 600° C. in air for at least 6-12 hours) to dry the powder. Baking the loose powder can also remove volatile species such as adsorbed hydrocarbons and other processing induced impurities from the particle surfaces, thus improving the purity of the loose powder and reducing the potential for the creation of scattering sites in the final product. The baking temperature should be carefully selected since baking at higher temperatures causes exaggerated grain growth in the subsequently densified body, while lower temperatures do not completely remove the carbon species.

Figure 2B:
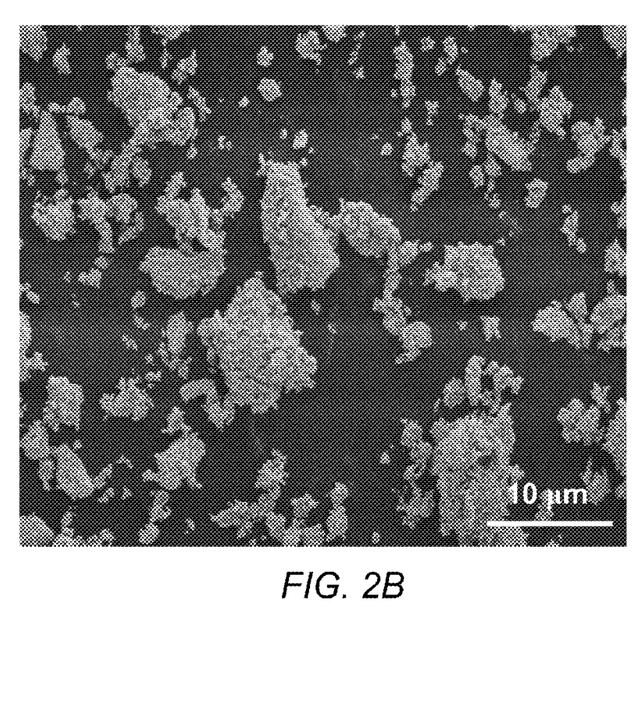

FIG. 2B illustrates a LiF-coated Yb:Y$_2$O$_3$ ceramic powder in accordance with the present invention, in which the LiF sintering aid has been dissolved and precipitated onto the powder particles. As can be seen, particularly when compared with the powder shown in FIG. 2A in which the LiF sintering aid has been mechanically mixed, a ceramic powder having a dissolved and precipitated sintering aid has far greater uniformity. This can produce a transparent ceramic material having less scattering and attenuation loss, making it more suitable for use as a solid state laser material, i.e., a ceramic laser material capable of demonstrating lasing.

As noted above, when the powder is coated with the LiF sintering aid, as this invention teaches, greater than 90% of the powder can be used and the final ceramic product yield is greater than 95%. This is due to a combination of factors.

In accordance with the present invention, the LiF concentration is reduced to only 0.2% because the homogeneity of the sintering aid distribution is on the nano scale and there is no need to add larger amounts of sintering aid in an attempt to have no deficient regions. In addition, there is no need to hold the temperature of the hot press around the melting point of the sintering aid for a period of time in an attempt to increase homogeneity or to further hold the temperature of the hot press at the point where the sintering aid is removed because the distribution of the sintering aid is already homogeneous within the ceramic powder on a nano scale, and in any case there is very little sintering aid to be removed by evaporation and/or sublimation.

The even distribution of sintering aid achieved in accordance with the present invention also allows densification under less harsh conditions than traditionally used and allows critically needed flexibility in the hot pressing schedule.

Traditional hot pressing conditions tend to accelerate the formation and trapping of reaction byproducts due to the use of higher temperatures and pressures, necessary holds in the hot pressing schedule to attempt to remove by-products, and longer pressing times at elevated temperatures. In contrast, even a reduction in densification temperature of 25° C. leads to a decrease in the amount of scattering sites and light absorption regions. Similarly, a 25° C. change in the pressure application temperature can mean the difference between a clear and a hazy article.

In a process for making a transparent ceramic in accordance with the present invention, the heating rates can be reduced since less LiF means less reaction with the yttria and thus fewer vacancies. The slower heating rates allow a more precise control over the densification dynamics of the yttria and a narrower temperature range over which the pressure is applied. For example, if it takes 5 minutes to apply pressure, a 5° C./min heating rate results in a temperature increase of 25° C., whereas a 20° C./min heating rate results in a 100° C. temperature increase. The slower heating rate also removes the need to add another hold to allow application of pressure at a controlled temperature. The holds lengthen the time where sintering aid/yttria interactions occur, and they also allow neck formation that results in trapped pores. Thus, by reducing or eliminating the need for temperature holds, the process of the present invention can significantly reduce the number of scattering sites in the final product.

In addition, although as described above the present invention can preferably use a highly uniform ceramic nanopowder having no hard agglomerates, because the sintering aid is distributed on each particle, the process of the present invention can be used with non-optimized powders and can result in high product yields, and so can improve the cost-effectiveness of producing and using transparent advanced ceramics such as transparent $Yb:Y_2O_3$.

Figure 4A:
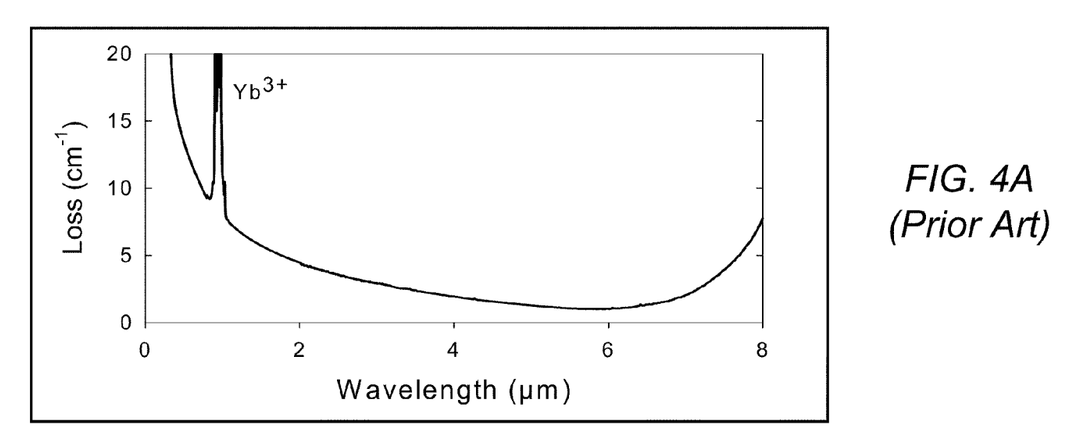
FIGS. 4A and 4B are plots of optical loss as a function of wavelength for a conventional transparent ceramic medium (FIG. 4A) and a transparent ceramic medium in accordance with the present invention (FIG. 4B).
Figure 4B:
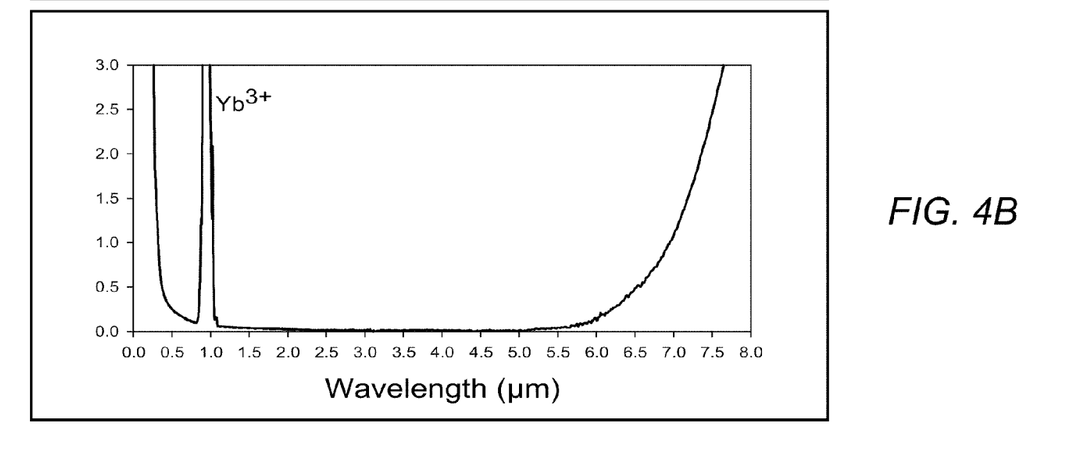

In addition, the ceramic laser materials described herein, such as ytterbium doped yttria ($Yb:Y_2O_3$) or scandia ($Yb:Sc_2O_3$) ceramic laser materials which have been fabricated by hot pressing and whose grain size is larger than 30 μm (but also could be smaller than 30 μm), can be fabricated into at least three typical laser geometries, i.e., rod, disc, and slab, and lasers using these materials can be constructed. To construct such a laser, the laser material is placed in a cavity which can be formed by external resonators or coatings deposited on the surface of the material. The material is pumped by a diode laser or other suitable source at typically around 915, 940, or 976 nm, and laser emission occurs typically around 1080 nm (1.08 μm). In addition, as seen in FIG. 4B, such a laser can have a transmission loss of about 0.2/cm in a wavelength range of about 0.6 to about 6.0 μm.

EXAMPLES

These aspects of the present invention can be further understood in the context of the following examples.

Example 1

This example teaches the process for making a $Y_2O_3$ ceramic using a sintering aid in accordance with conventional processes. In accordance with conventional processes, LiF and undoped $Y_2O_3$ particles are mechanically mixed and then densified by hot pressing under the following schedule: increase the temperature at 20° C./min to 950° C. and hold for 30 min.; increase the temperature at 20° C./min a second time to 1200° C. and hold for 30 min; and increase the temperature at ramp 20° C./min a third time to 1650° C. and hold 2-6 hours under vacuum and at a pressure of 2000 to 8000 psi. The holds are necessary to attempt to evenly distribute the LiF after it melts at 850° C. and to allow extra time for the removal of the LiF.

Example 2

This example uses the same mixing and pressing conditions as described in Example 1 above, but uses yttria doped with 10% ytterbium.

Example 3

This example teaches the process for making a transparent $Y_2O_3$ ceramic in accordance with the present invention. As described above, a high-quality transparent ceramic can be made by coating the ceramic powder with a sintering aid, so that direct contact of adjacent $Y_2O_3$ powder particles is minimized, and heat treating the coated powder prior to densification. Thus, in accordance with the present invention, in this example, $Y_2O_3$ ceramic nanopowders can be coated with LiF as a sintering aid and the coated powders heat treated at 600° C. for 4 to 18 hours in air prior to densification.

Figure 3:
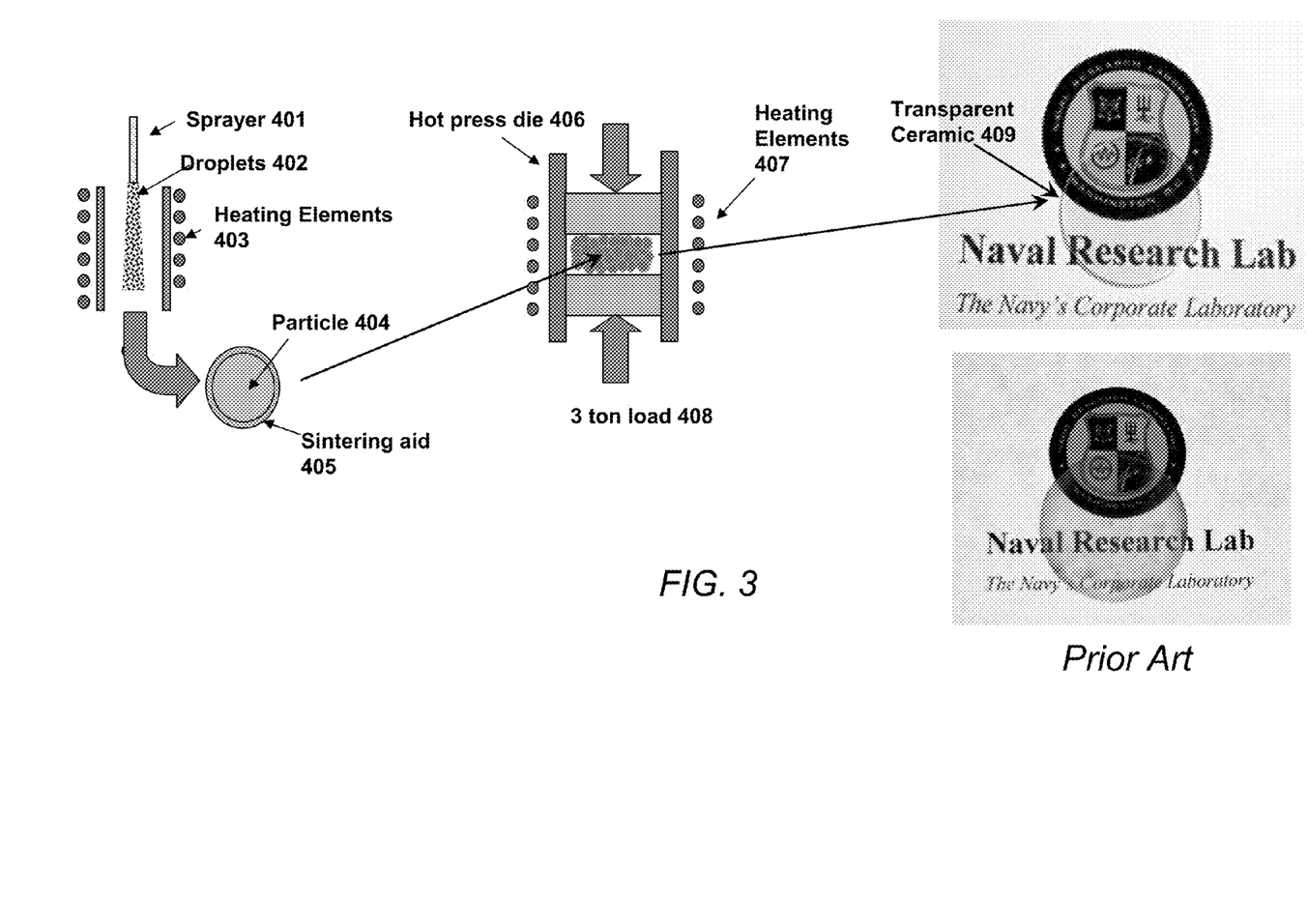
FIG. 3 depicts aspects of a process for making a transparent Yb:$Y_2O_3$ ceramic in accordance with the present invention.

FIG. 3 illustrates an exemplary embodiment of this process. In accordance with the present invention, coating the $Y_2O_3$ ceramic particles with the LiF sintering aid can be achieved by dissolving LiF in water, adding the $Y_2O_3$ powder to the solution, and spraying the mixture using sprayer 401 to form droplets 402 that travel into a controlled heat gradient created by heating elements 403. Subjecting the coated particles to heat, e.g., heat at 600° C. for 4 to 18 hours as described above, supersaturates the $Li^+$ and $F^-$ ions, causing the ions to nucleate on the $Y_2O_3$ particles 404 as sintering aid LiF 405 and thus the coated ceramic particles.

The coated ceramic particles can then be densified in hot press die 406 having heating elements 407 and 3-ton load 408 shown in FIG. 3 using the same hot pressing schedule as described above with respect to Example 1 to produce transparent ceramic 409. The material can be made into any suitable shape using hot pressing, such as the rod, disk, or slab shapes often used in laser applications.

Transparent ceramic 409 has a high and uniform transparency over 95% of the total area. This permits higher yield and lower cost as well as potential for large size fabrication.

In addition, as shown in FIG. 4B, the loss is consistently low over the material surface.

Example 4

Taking advantage of the flexibility in hot pressing parameters offered by the coated samples, the powder is processed as described above in Example 3, but the hot pressing conditions can be changed to produce a stronger finer grained sample with better optical and lasing qualities. In this example, the powder is densified by hot pressing with the temperature being increased at a ramp rate of 20° C./min to 1000° C. and then at a rate of 5° C./min to 1500° C., which is then held for 2 hours at a pressure of 2000 to 8000 psi. Note that in this Example, there is no intermediary hold between the first and second temperature ramps.

Fabricating a $Y_2O_3$ ceramic with this heating/pressing schedule using a mechanically mixed LiF sintering aid results in a barely translucent sample possessing gray and white splotchy regions, which is in stark contrast to the transparent sample 409 shown in FIG. 3.

The lack of transparency and uniformity makes such a ceramic clearly unsuitable as a high-quality solid state laser material. FIG. 4A is a plot showing the transmission loss for such a ceramic, and shows a loss greater than 0.2/cm. In addition, the loss varies with position on the ceramic surface and is random, limiting usefulness of ceramic material.

Figure 5A:
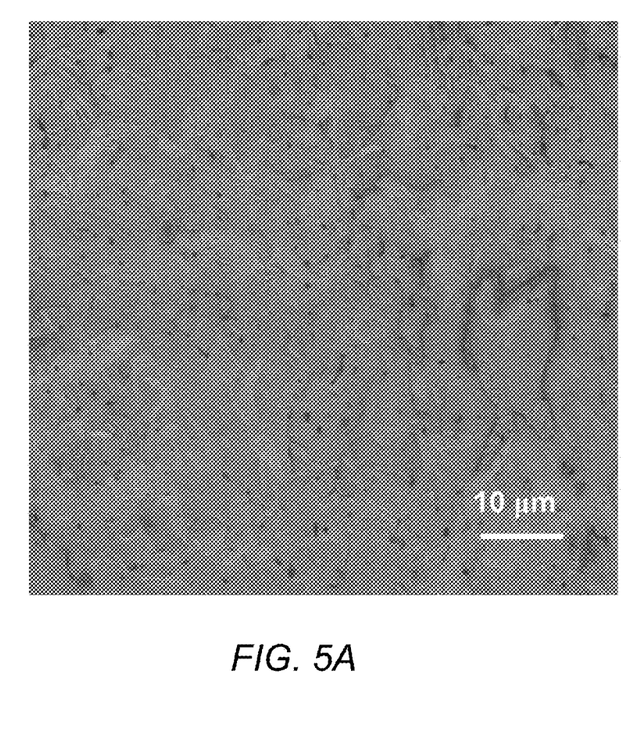
FIGS. 5A and 5B are micrographs illustrating the porosity of a transparent $Y_2O_3$ ceramic prepared in accordance with conventional processes (FIG. 5A) and in accordance with the present invention (FIG. 5B).

In addition, fabricating a ceramic material using particles coated with the sintering aid in accordance with the present invention can significantly decrease the porosity of the final ceramic. FIG. 5A shows a micrograph of the internal porosity of a ceramic prepared in accordance with Example 2 described above. As can be easily seen, this sample is highly porous, which can cause it to exhibit significant scattering loss and reduced strength.

Figure 5B:
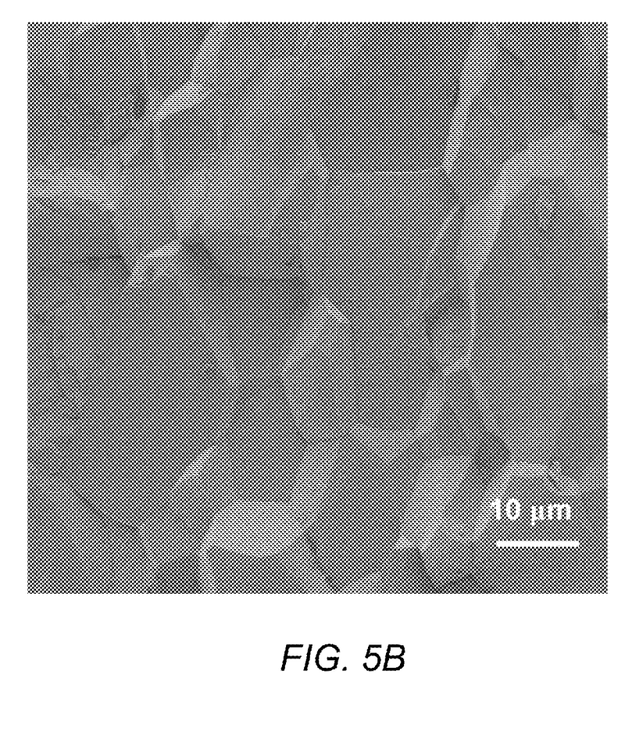

In contrast, FIG. 5B shows a micrograph of the porosity of a ceramic material prepared from LiF-coated ceramic nanoparticles in accordance with Example 4 described above. As can be seen, this ceramic is essentially pore-free, and thus has significantly lower scattering losses and higher strength.

Thus, in accordance with the present invention, a high-quality, low-scattering, low-absorption transparent ceramic can be manufactured which can be used in high power laser systems and as highly transmissive windows and domes.

For example, a transparent ceramic material used as a solid state laser gain material (e.g., slab, rod, or disk) can be placed in a cavity formed by external resonators or coatings placed on the material's surface, and the material pumped by a diode laser or other suitable source, typically at around 915, 940, or 976 nm, with laser emission typically occurring at around 1080 nm.

Example 5

Figure 6:
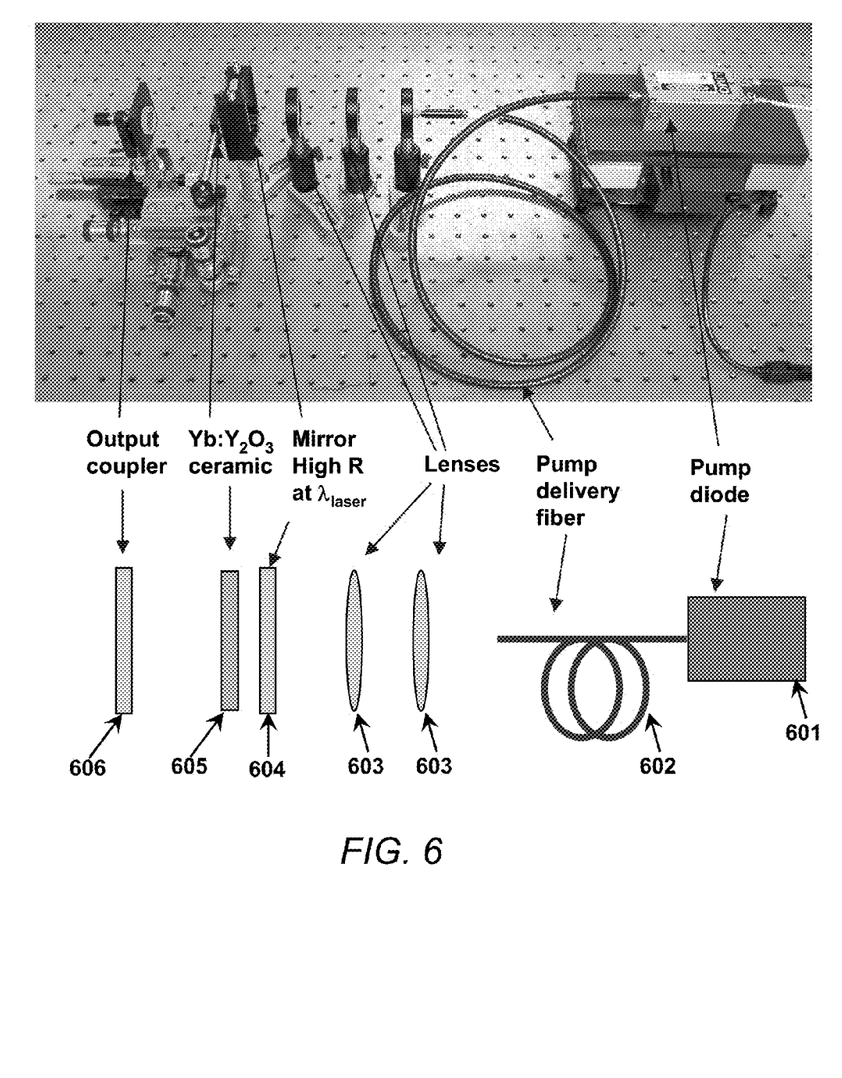
FIG. 6 depicts an exemplary configuration of a laser using a transparent Yb:$Y_2O_3$ ceramic in accordance with the present invention.

An exemplary embodiment of a laser using a transparent ceramic laser material in accordance with the present invention is shown in FIG. 6. In the exemplary embodiment shown in FIG. 6, a hot pressed 2% $Yb:Y_2O_3$ transparent ceramic material 605, with grains larger than 30 μm, having dimensions ~2 mm thick by ~3 mm diameter was placed in a laser cavity formed by a thin film deposited on one surface of the laser material 605 and an external mirror 604. The thin film is high reflectivity >99.9% at 1080 nm and high transmission >98% at the pump wavelength of 937 nm. The external mirror 604 is a 50 cm concave mirror with 2% transmission at the laser wavelength of 1080 nm. The other surface of the hot pressed $Yb:Y_2O_3$ laser material is coated with an anti-reflection coating at 1080 nm. The $Yb:Y_2O_3$ laser material is end-pumped by pump diode 601 and pump delivery fiber 602 through lenses 603 and through the first film coating. Laser emission occurred through output coupler 606 at 1076 nm.

Figure 7A:
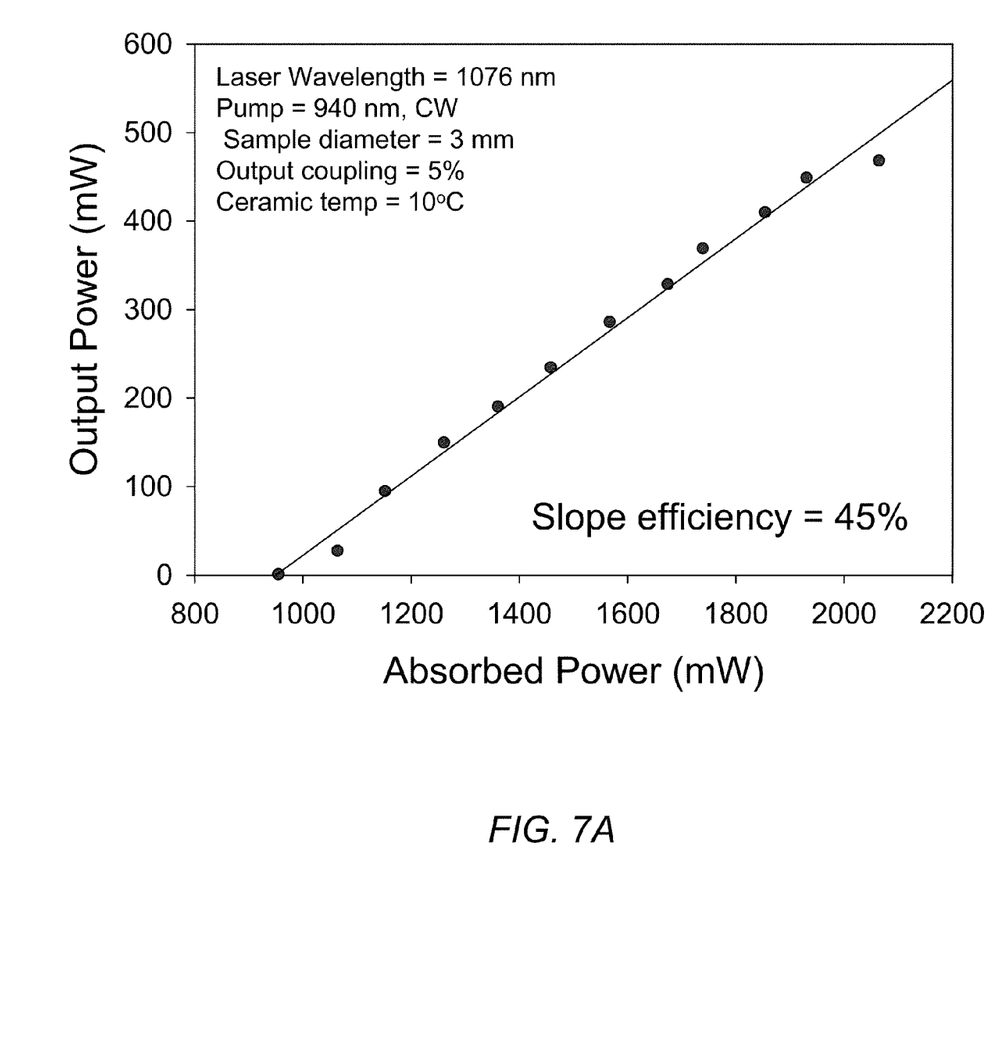
FIGS. 7A and 7B are plots showing the performance of a laser using a transparent Yb:$Y_2O_3$ ceramic in accordance with the present invention in terms of output power vs. absorbed pump power (FIG. 7A) and output pulse energy vs. absorbed pulse energy (FIG. 7B).
Figure 7B:
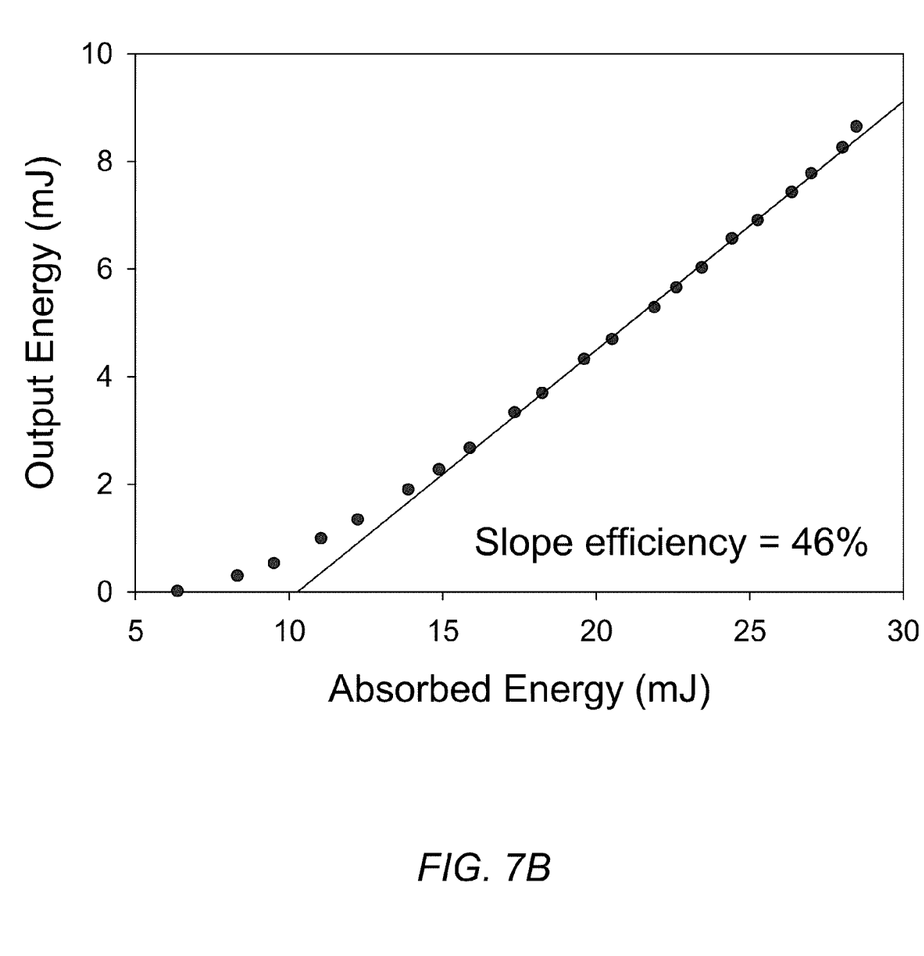

FIGS. 7A and 7B are plots showing the performance of this laser. As seen in FIG. 7A, a laser using a hot pressed 2% $Yb:Y_2O_3$ transparent ceramic material in accordance with the present invention exhibits a 45% slope efficiency of output power versus absorbed pump power This is derived from the slope of FIG. 7A. Similarly, as can be seen from the plot in FIG. 7B, such a laser exhibits a 46% slope efficiency of laser pulse energy output versus absorbed pulse energy.

Thus, a laser using a hot pressed 2% $Yb:Y_2O_3$ transparent ceramic material in accordance with the present invention also exhibits lasing when the grain size is above 30 μm.

As noted above, a transparent ceramic material produced in accordance with the present invention can have many other uses as well. For example, an undoped transparent ceramic such as an undoped $Y_2O_3$ (or $Sc_2O_3$) ceramic can be used in many applications where a highly shatter-resistant transparent material would be desirable, such as windows, lens covers, etc. Alternatively, if it is desirable that certain wavelengths be attenuated, the base material and dopant can be chosen to achieve the desired attenuation/transmission properties.

In addition, coating the individual ceramic particles with the sintering aid in accordance with the present invention allows for greater flexibility in the densification process, making mass fabrication of any of these transparent ceramics less difficult and less expensive.

Although particular embodiments, aspects, and features have been described and illustrated, it should be noted that the invention described herein is not limited to only those embodiments, aspects, and features. It should be readily appreciated that modifications may be made by persons skilled in the art, and the present application contemplates any and all modifications within the scope and spirit of the present disclosure.

What is claimed is:

1. A hot-pressed transparent polycrystalline ceramic comprising a $Yb^{3+}$ doped $Y_2O_3$ ceramic having a $Yb^{3+}$ dopant concentration of from about 0 to about 20%, and having combined scattering and absorption losses of less than 0.2/cm over a wavelength range of about 0.6 to about 6.0 μm.

2. The hot-pressed transparent polycrystalline ceramic according to claim 1, wherein the ceramic has a grain size of greater than 30 μm.

3. The hot-pressed transparent polycrystalline ceramic according to claim 1, wherein the ceramic has a grain size of less than 30 μm.

4. The hot-pressed transparent polycrystalline ceramic according to claim 1, wherein the ceramic comprises densified ceramic nanopowder, the nanopowder comprising individual ceramic powder particles coated with a sintering aid to minimize direct contact of adjacent ceramic powder particles.

5. The hot-pressed transparent polycrystalline ceramic according to claim 4, wherein the sintering aid comprises LiF.

6. A hot-pressed transparent polycrystalline ceramic comprising a $Yb^{3+}$ doped $Sc_2O_3$ ceramic having a $Yb^{3+}$ dopant concentration of from about 0 to about 20%, and having combined scattering and absorption losses of less than 0.2/cm over a wavelength range of about 0.6 to about 6.0 μm.

* * * * *